(12) United States Patent
Ishihara et al.

(10) Patent No.: US 8,116,923 B2
(45) Date of Patent: Feb. 14, 2012

(54) STABILIZED APPROACH MONITOR

(75) Inventors: Yasuo Ishihara, Kirkland, WA (US); Steve Johnson, Issaquah, WA (US)

(73) Assignee: Honeywell International, Morristown, NJ (US)

( * ) Notice: Subject to any disclaimer, the term of this patent is extended or adjusted under 35 U.S.C. 154(b) by 267 days.

(21) Appl. No.: 12/621,794

(22) Filed: Nov. 19, 2009

(65) Prior Publication Data

US 2011/0118911 A1    May 19, 2011

(51) Int. Cl.
*B64D 45/04* (2006.01)
*G06F 19/00* (2011.01)
*G01C 23/00* (2006.01)
*B64D 45/00* (2006.01)

(52) U.S. Cl. ......... 701/17; 701/4; 701/8; 701/9; 701/14; 701/18

(58) Field of Classification Search .................. 244/186; 340/951, 963, 967, 970; 342/65; 701/9, 701/17, 18, 206
See application file for complete search history.

(56) References Cited

U.S. PATENT DOCUMENTS

| | | | |
|---|---|---|---|
| 4,551,723 A * | 11/1985 | Paterson | 340/946 |
| 5,153,588 A * | 10/1992 | Muller | 340/968 |
| 5,166,682 A | 11/1992 | Bateman | |
| 5,196,847 A | 3/1993 | Bateman | |
| 5,608,392 A | 3/1997 | Faivre et al. | |
| 6,317,663 B1 * | 11/2001 | Meunier et al. | 701/16 |
| 6,567,728 B1 * | 5/2003 | Kelly et al. | 701/9 |
| 2001/0052562 A1 * | 12/2001 | Ishihara et al. | 244/175 |
| 2002/0040263 A1 * | 4/2002 | Johnson et al. | 701/17 |
| 2002/0113719 A1 * | 8/2002 | Muller et al. | 340/961 |
| 2003/0016145 A1 * | 1/2003 | Bateman | 340/967 |
| 2003/0113719 A1 * | 6/2003 | Ashkenazi et al. | 435/6 |
| 2004/0075586 A1 * | 4/2004 | Glover | 340/963 |
| 2004/0093131 A1 * | 5/2004 | Block et al. | 701/9 |
| 2006/0195235 A1 | 8/2006 | Ishihara et al. | |

* cited by examiner

*Primary Examiner* — Khoi Tran
*Assistant Examiner* — Dale Moyer
(74) *Attorney, Agent, or Firm* — Lowe Granham Jones PLLC

(57) ABSTRACT

Systems and methods for suppressing an unstable alert when the aircraft is in the process of landing on a temporarily displaced threshold. In an example process, a processor on the aircraft determines the aircraft is on an approach to landing on a runway based on information received from one or more data sources on the aircraft, then retrieves predefined glideslope information for the runway from a memory device that is in signal communication with the processor. Next, the processor determines whether position of the aircraft is above the predefined glideslope by a first threshold amount. If the aircraft is determined to be above the predefined glideslope by the first threshold amount, the processor issues an unstable alert only if a flight path angle of the aircraft is greater than an angle of the predefined glideslope by a second threshold amount.

11 Claims, 3 Drawing Sheets

STABILIZED APPROACH MONITOR

BACKGROUND OF THE INVENTION

During a true "unstabilized approach" scenario, pilots are almost always trying to get back on a proper approach path. So, if the aircraft is "too high", the pilot dives the aircraft to intercept a proper glideslope (often 3 degrees). This means if the proper glideslope is three degrees and the aircraft is way above the glideslope ("too high" scenario), the aircraft will be flown at greater than a 3° flight path angle to descend and intercept the 3° glideslope.

In an existing stabilized approach monitor (SAM) such as that produced by Honeywell International, Inc., when a pilot is intending to land on a temporarily displaced threshold (often due to construction), the SAM issues a "Too High" alert on a perfectly stabilized approach. This is because the SAM is not aware of a temporary displaced threshold. Therefore, the aircraft appears to be too high with respect to the predefined glideslope to the runway threshold stored in the runway database. Therefore, the alert is a nuisance because the aircraft is on a stabilized approach to the displaced threshold.

SUMMARY OF THE INVENTION

The present invention provides systems and methods for suppressing an unstable alert when the aircraft is in the process of landing on a temporarily displaced threshold. In an example process, a processor on the aircraft determines the aircraft is on an approach to landing on a runway based on information received from one or more data sources on the aircraft, then retrieves predefined glideslope information for the runway from a memory device that is in signal communication with the processor. Next, the processor determines whether position of the aircraft is above the predefined glideslope by a first threshold amount. If the aircraft is determined to be above the predefined glideslope by the first threshold amount, the processor issues an unstable alert only if a flight path angle of the aircraft is greater than an angle of the predefined glideslope by a second threshold amount.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
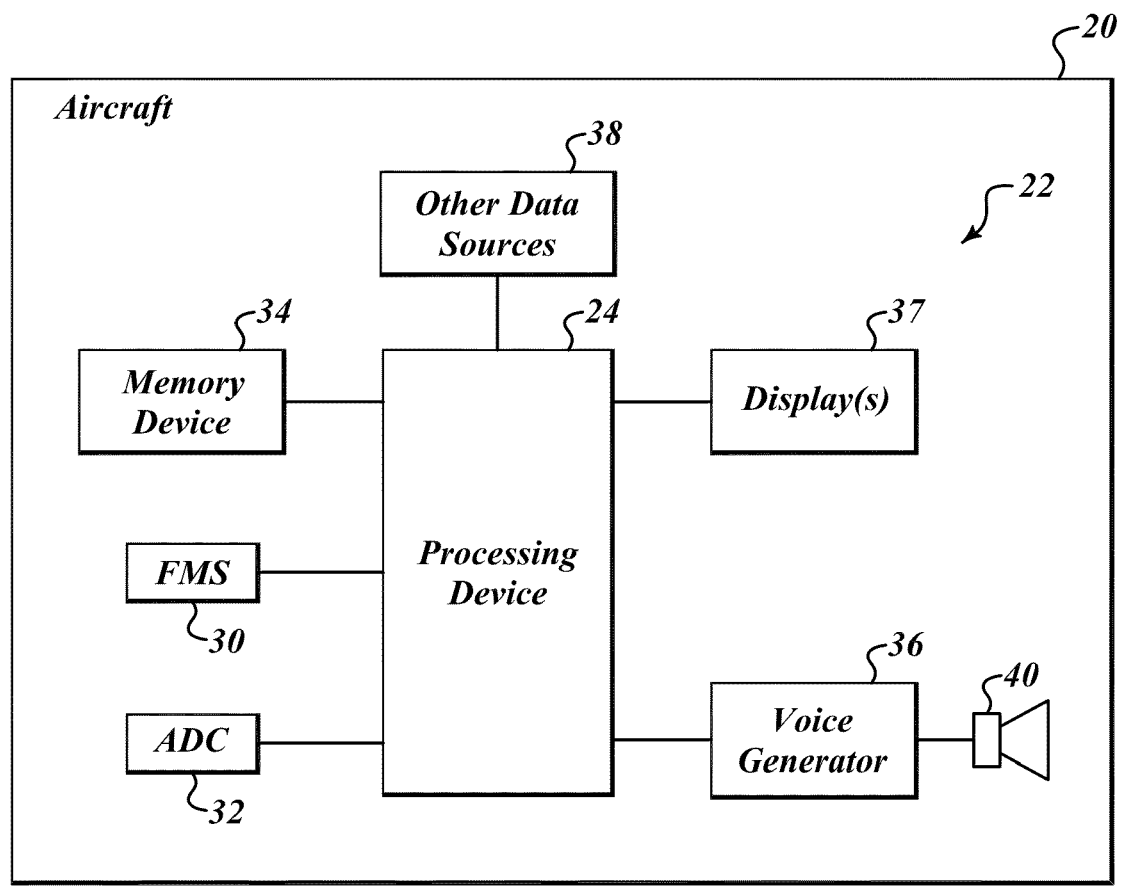
FIG. 1 illustrates an example system formed in accordance with an embodiment of the present invention.

FIG. 1 illustrates an example aircraft 20 having a system 22 that performs stabilized approach monitoring when the aircraft 20 is on an approach to landing. The present invention avoids nuisance warnings when the aircraft 20 is landing on runway having a temporarily displaced runway threshold. Reasons for the temporary displaced threshold may include maintenance at the approach end of the runway or some other temporary non-Federal Aviation Administration (FAA)-reported change that would cause a change in the approach profile.

The system 22 includes a processing device 24, a flight management system (FMS) 3, an air data computer (ADC) 32, a memory device 34, a voice generator 36, one or more displays 37, other data sources 38, and one or more speakers 40. The processing device 24, such as an Enhanced Ground Proximity Warning System processor produced by Honeywell International, Inc., is in signal communication with the FMS 30, the memory device 34, the voice generator 36, the displays 37, and the other data sources 38. The speaker 40 is in signal communication with the voice generator 36.

The processing device 24 performs stabilized approach monitoring as the aircraft 20 is on approach to landing. The processing device 24 determines whether the aircraft 20 is on a stabilized approach to landing based on aircraft position and configuration information received from the other data sources 38, such as a global positioning system (GPS), airport and runway information stored in the memory device, and other flight-related information received from the ADC 32, Inertial Reference System (IRS) (not shown), or the GPS. Vertical speed and ground speed, which can be used to compute the flight path angle, are obtained from the ADC, the IRS or the GPS. Automatic runway selection is described in U.S. Pat. No. 6,304,800, which is hereby incorporated by reference. After the processing device 24 has determined that the aircraft 20 is on approach to landing, information related to the runway on which the aircraft 20 is landing is provided. The provided information includes predefined glideslope information, which includes the location of the runway threshold on the runway and glideslope angle to that threshold. The processing device 24 then determines whether the aircraft 20 is on the predefined glideslope. If the aircraft 20 is not on the predefined glideslope, then the processing device 24 determines whether the aircraft 20 is attempting to get back to the glideslope. If the processing device 24 determines that the aircraft 20 is attempting to descend and get back to the predefined glideslope, then an alert is outputted to the displays 37 and/or the voice generator 36 in order to alert the flight crew that they are too high.

However, if the aircraft 20 is not attempting to get back to the predefined glideslope, and the aircraft 20 is maintaining a flight path angle comparable to the predefined glideslope angle, then the processing device 24 assumes that the aircraft is attempting to land long—the conclusion being a temporary displaced landing threshold. In this situation, the processing device 24 does not issue an alert to the displays 37 or the voice generator 36 (i.e. suppressing the too high alert).

Figure 2:
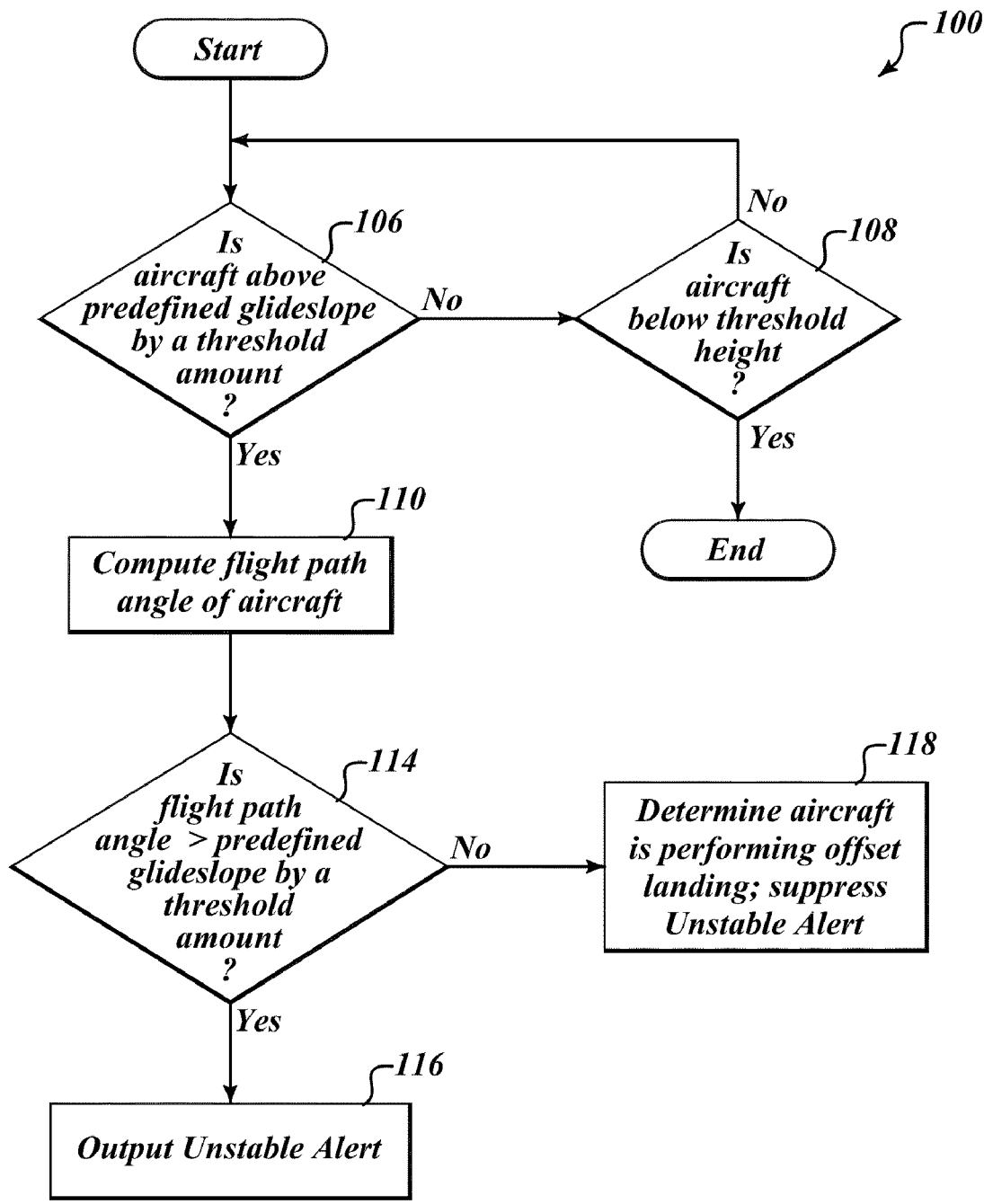
FIG. 2 is a flow chart of an example process performed by the system shown in FIG. 1.

FIG. 2 illustrates a flow diagram of an exemplary process 100 performed by the system 22 shown in FIG. 1. The process 100 begins after it has been determined that the aircraft 20 is on an approach to landing to a runway. At a decision block 106, the processing device 24 determines whether the aircraft 20 is above the predefined glideslope for the runway by a predefined threshold amount. The predefined glideslope is retrieved from the memory device 34 or from some other source. If the processing device 24 determines that the aircraft 20 is not above the predefined glideslope by the threshold amount, then the processing device 24 determines whether the aircraft 20 is below a threshold height above the runway, see decision block 108. If the aircraft 20 at this point is below the threshold height above the runway (i.e., ground), the process 100 ends. In other words, if the aircraft is about to touchdown there is no need to continue this process 100.

However, if the aircraft 20 is not below the threshold height above the runway, the process 100 returns to the decision block 106. If at the decision block 106 the processing device 24 determines that the aircraft 20 is above the predefined glideslope by the threshold amount, then, at a block 110, the processing device computes the flight path angle of the aircraft 20. In an alternate embodiment, the flight path angle is previously computed from another component, such as the FMS 30, and retrieved at this step. Next, at a decision block 114, the processing device 24 determines whether the flight path angle is greater than the predefined glideslope angle by a predefined threshold amount. If the flight path angle is not determined to be greater than the predefined glideslope angle by the predetermined threshold amount, then, at a block 118, the processing device 24 concludes that the aircraft 20 is performing a temporary offset landing and thus suppresses an unstable alert related to being too high. If, at the decision block 114, the processing device 24 determines that the flight path angle is greater than the predefined glideslope angle by the predetermined threshold amount, then the processing device 24 concludes that the aircraft 20 is attempting to get back to the predefined glideslope, thus placing the aircraft 20 in an unstable alert condition. The processing device 24, in this situation, outputs (audibly, visually or tactilely) the unstable alert related to being too high, see block 116.

Figure 3:
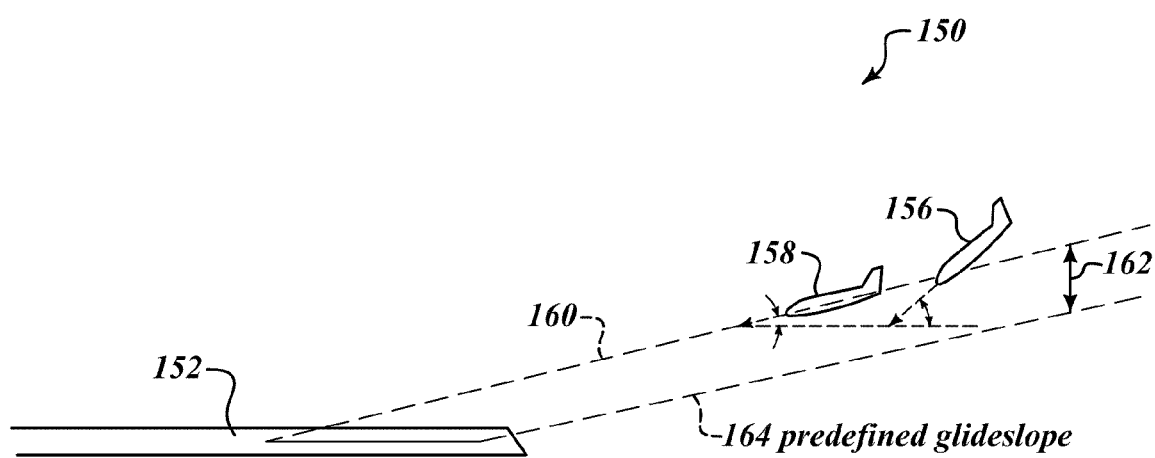
FIG. 3 is a side view of aircraft having different approach profiles.

FIG. 3 illustrates a side view of a landing scenario 150 for a first aircraft 156 and a second aircraft 158. Both of the aircraft 156, 158 are on a glideslope 160, which is higher than a predefined glideslope 164 for the runway 152 on which the aircraft 156, 158 are attempting to land. In this situation, the aircraft 156, 158 are presently displaced from the predefined glideslope 164 by a distance 162 that is greater than a predefined threshold distance. Thus, the processing device 24 computes the flight path angle (i.e., angle of velocity vector relative to the horizon) for the aircraft 156, 158 and compares the computed flight path angle to the angle of the predefined glideslope 164. Because the flight path angle for the first aircraft 156 is greater than the angle for the predefined glideslope 164 by a threshold amount, the processing device 24 determines that the first aircraft 156 is attempting to return to the predefined glideslope 164. In this case, the processing device 24 determines that the first aircraft 156 is in an unstable approach condition relating to being too high above the predefined glideslope 164. Therefore, a "too high" audio and/or visual alert is outputted to the flight crew.

The second aircraft 158 has a flight path angle that is within the threshold amount of the angle of the predefined glideslope 164. Therefore, the processing device 24 determines or concludes that the second aircraft 158 is on a stable approach on the glideslope 160 to a temporary displaced threshold on the runway 152. As such, no alert relating to being too high above the predefined glideslope 164 is outputted.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed on an aircraft, the method comprising:
    using a processor on the aircraft,
        a) retrieving predefined glideslope information for a runway from a memory device in signal communication with the processor, when the aircraft is on an approach to landing on the runway based on information received from one or more data sources on the aircraft;
        b) determining whether position of the aircraft is above the predefined glideslope by a first threshold amount; and
        c) when it is determined that the aircraft is above the predefined glideslope by the first threshold amount, issuing an unstable alert only if a flight path angle of the aircraft is greater than an angle of the predefined glideslope by a second threshold amount.

2. The method of claim 1, further comprising computing the flight path angle of the aircraft when it is determined that the aircraft is above the first threshold amount above the predefined glideslope.

3. The method of claim 1, further comprising suppressing an unstable alert when the flight path angle is not greater than an angle of the predefined glideslope by the second threshold amount.

4. The method of claim 1, further comprising repeating the step of determining whether position of the aircraft is above the predefined glideslope by the first threshold amount after a predefined delay period if the aircraft was previously determined to not be above the predefined glideslope by the first threshold amount and if the aircraft is presently not below a threshold height above the runway.

5. An aircraft comprising:
    a memory device configured to store airport information comprising runway glideslope information;
    one or more data sensors configured to at least determine position of the aircraft;
    an output device; and
    a processing device in signal communication with the memory device, the one or more position sensors and the output device, the processing device comprising:
        a first component configured to determine whether the aircraft is above predefined glideslope retrieved from the memory device when on a approach to landing by at least a first threshold amount based on a determined position;
        a second component configured to compute flight path angle of the aircraft when it is determined that the aircraft is above the predefined glideslope by at least the first threshold amount; and
        a third component configured to issue an unstable alert to the output device only if the computed flight path angle of the aircraft is greater than an angle of the predefined glideslope by a second threshold amount.

6. The aircraft of claim 5, wherein the processing device further comprises a fourth component configured to suppress an unstable alert when the flight path angle is not greater than the angle of the predefined glideslope by the second threshold amount.

7. The aircraft of claim 5, wherein the processing device further comprises a fourth component configured to return to the second component after a predefined delay period if the aircraft was previously determined to not be above the predefined glideslope by the first threshold amount and if the aircraft is not presently below a threshold height above the runway.

8. The aircraft of claim 5, wherein the output device comprises one of an audio or visual device.

9. A system located on an aircraft, the system comprising:
    a means for storing predefined glideslope information for a runway;
    a means for determining whether a position of the aircraft is above a predefined glideslope of the runway by a first threshold amount when the aircraft is on an approach to landing to the runway;

a means for computing a flight path angle of the aircraft when it is determined that the aircraft is above the first threshold amount above the predefined glideslope; and a means for issuing an unstable alert only if the computed flight path angle of the aircraft is greater than an angle of the predefined glideslope by a second threshold amount.

10. The system of claim 9, further comprising a means for suppressing an unstable alert when the flight path angle is not greater than an angle of the predefined glideslope by the second threshold amount.

11. The system of claim 9, further comprising a means for returning to the means for determining whether the position of the aircraft is above the predefined glideslope after a predefined delay period if the aircraft was previously determined to not be above the predefined glideslope by the first threshold amount and if the aircraft is presently not below a threshold height above the runway.

\* \* \* \* \*